United States Patent [19]

Kaiya et al.

[11] Patent Number: 5,545,831
[45] Date of Patent: Aug. 13, 1996

[54] SILICONE COMPOSITIONS FOR THE FORMATION OF CURED RELEASE COATINGS

[75] Inventors: Nobuo Kaiya; Hideki Kobayashi; Wataru Nishiumi, all of Chiba, Japan

[73] Assignee: Dow Corning Toray Silicone Co., LTD., Tokyo, Japan

[21] Appl. No.: 325,737

[22] Filed: Oct. 19, 1994

[30] Foreign Application Priority Data

Oct. 22, 1993 [JP] Japan ................................. 5-287613

[51] Int. Cl.$^6$ .................................................... C08K 5/24
[52] U.S. Cl. ........................... 524/731; 528/15; 524/264; 524/267
[58] Field of Search ................................. 524/264, 267, 524/731; 528/15

[56] References Cited

U.S. PATENT DOCUMENTS

| | | | |
|---|---|---|---|
| 3,527,659 | 9/1970 | Keil | 117/145 |
| 4,123,604 | 10/1978 | Sandford, Jr. | 528/31 |

FOREIGN PATENT DOCUMENTS

A178557  9/1983  Australia .................... C08F 283/12

*Primary Examiner*—Melvyn I. Marquis
*Attorney, Agent, or Firm*—Timothy J. Troy

[57] ABSTRACT

The present invention relates to a silicone composition comprising (A) a silicone release coating composition and (B) an organosilicon compound having the general formula

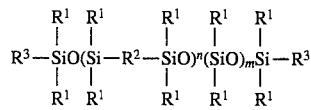

where $R^1$ is a monovalent hydrocarbon group, $R^2$ is an alkylene group, $R^3$ is a hydrogen atom, an alkenyl group, or a hydroxyl group, m has a value of zero or greater, and n has a value of greater than zero which cures to form a release coating. The silicone release coating compositions of this invention give a cured release coating which exhibits optimal release values against lucky substances and which does not impair the residual adhesion of tacky substances.

22 Claims, No Drawings

SILICONE COMPOSITIONS FOR THE FORMATION OF CURED RELEASE COATINGS

BACKGROUND OF THE INVENTION

The present invention relates to a silicone composition that cures to form a release coating (hereinafter abbreviated as a silicone release coating composition). More specifically, the invention relates to a silicone release composition that gives a cured release coating which exhibits optimal release values against tacky substances and which does not impair the residual adhesion of tacky substances.

Cured films with excellent release properties for tacky substances can be formed on the surface of a substrate, for example, on paper, cardboard, laminated paper, synthetic plastic films, fabrics, synthetic fibers, and metal foils by coating thee substrate with an organopolysiloxane-based silicone release composition and then curing the coated composition.

A general problem associated with dimethylpolysiloxane-based silicone release compositions has been the extremely low peel strength values exhibited by their cured coatings. As a result, it has been necessary to add controlled-release additives (CRAs) to these compositions in order to adjust the peel strength of their cured release coatings. These CRAs are exemplified by the MQ silicone copolymer taught in Japanese Patent Application Laid Open No. 49-27033 [27,033/74] and Japanese Patent Application Laid Open No. 59-84953 [84,953/84] which consists of the $R_3SiO_{1/2}$ and the $SiO_{4/2}$ unit wherein R denotes monovalent hydrocarbon groups having no more than 2 carbons. Another example of a CRA is the MQ silicone copolymer taught in Japanese Patent Application Laid Open No. 53-29678 [29,678/78] which consists of the $R_3SiO_{1/2}$, $(CH_2=CH)R_2SiO_{1/2}$, and $SiO_{4/2}$ units where R again denotes monovalent hydrocarbon groups having no more than 2 carbons.

The addition of these MQ silicone copolymer CRAs to silicone release compositions does serve to increase the peel strength of cured release coatings whose peel strengths are at or below 20 gf/5 cm, for example, in applications with seals, labels, and pressure-sensitive adhesive tape. However, the addition of this particular type of CRA also results in substantial migration of the silicon component into the tacky substance, which significantly impairs the residual adhesion of the tacky substance. Moreover, since these MQ silicone copolymers are solids at room temperature, their addition to silicone release coating compositions results in an increase in composition viscosity, which degrades the coating properties of the composition.

SUMMARY OF THE INVENTION

It is an object of the present invention to produce a silicone composition that cures to form a release coating.

It is also an object of the present invention to produce a silicone release composition which gives a cured release coating which exhibits optimal release values against tacky substances and which does not impair the residual adhesion of tacky substances.

A further object of the present invention to produce a novel controlled release additive which can be employed in silicone release coating compositions.

It is also an object of the present invention to produce a solvent free silicone release coating compositions containing controlled release additives.

DETAILED DESCRIPTION OF THE INVENTION

The present invention relates to a composition comprising: (A) a silicone release coating composition, and (B) an organosilicon compound having the general formula:

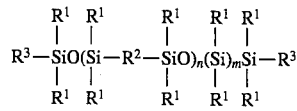

wherein $R^1$ denotes a monovalent hydrocarbon group having from 1 to 10 carbon atoms and free of aliphatic unsaturation, $R^2$ denotes an alkylene group having from 2 to 10 carbon atoms, $R^3$ is selected from the group consisting of a hydrogen atom, an alkenyl group having from 2 to 10 carbon atoms, and a hydroxyl group, m has a value of zero or greater than zero, and n has a value of greater than zero.

The silicone release coating composition of (A) can be, for example, an addition reaction-curing silicone release coating composition, a condensation reaction-curing silicone release coating composition, an organoperoxide-curing silicone release coating composition, and a radiation curing (for example silicone release coatings which are curable by ultraviolet or electron beam radiation) silicone release coating composition. Addition reaction-curing and condensation reaction-curing silicone release coating compositions are preferred.

Preferred as the addition reaction-curing silicone release coating compositions are silicone release coating compositions comprising (i) 100 weight parts of an organopolysiloxane having at least 2 alkenyl groups in each molecule and having a viscosity of at least 40 centipoise at 25° C., (ii) 0.5 to 90 weight parts organopolysiloxane having at least 2 silicon-bonded hydrogen atoms in each molecule and having a viscosity of 1 to 1,000 centipoise at 25° C., and (iii) a catalytic quantity of a metal catalyst or complex thereof.

The organopolysiloxane of component (i) is the main or base component of the addition reaction-curing silicone release coating composition. This component must have a viscosity at 25° C. of at least 40 centipoise and must contain at least 2 alkenyl groups in each molecule. Preferably component (i) is a compound having the average unit formula $R^4_a SiO_{(4-a)/2}$ wherein $R^4$ denotes monovalent hydrocarbon groups, at least 2 of the $R^4$ groups in the organopolysiloxane are alkenyl groups, and has a value of from 1.95 to 2.05. The monovalent hydrocarbon groups of $R^4$ in the above formula are specifically exemplified by alkyl groups such as methyl, ethyl, propyl, and butyl, alkenyl groups such as vinyl, allyl, butenyl, pentenyl, and hexenyl, aryl groups such as phenyl, tolyl, and xylyl, aralkyl groups such as benzyl and phenethyl, and halogen-substituted alkyl groups such as 3-chloropropyl and 3,3,3-trifluoropropyl. At least 2 of the $R^4$ groups in the organopolysiloxane defined by the preceding formula must be alkenyl. The preferred non-alkenyl monovalent hydrocarbon groups for $R^4$ is methyl. The subscript a in the preceding formula preferably has a value of 1.95 to 2.05.

The molecular structure of component (i) is not critical, and it may be, for example, straight chain, cyclic, network, and partially branched straight chain, with straight-chain structures being preferred. The molecular chain terminal groups for the straight-chain forms of component (i) are specifically exemplified by trimethylsiloxy, dimethylvinylsiloxy, dimethylphenylsiloxy, and dimethylhydroxysiloxy groups.

Component (i) must have a viscosity at 25° C. of at least 40 centipoise, while the upper limit on its viscosity ranges up to and include the use of gums. When component (i) has a viscosity below 40 centipoise, excessively large amounts of the corresponding silicone release composition will infiltrate into the substrate. When the composition of this invention is used in a solventless form, component (i) preferably has a viscosity at 25° C. of 40 to 10,000 centipoise and more preferably of 100 to 5,000 centipoise. When the composition of this invention is used in a solvent-based formulation, component (i) preferably has a viscosity at 25° C. of 100,000 centipoise up to the viscosities of gums and more preferably of 500,000 centipoise at 25° C. up to the viscosities of gums.

The organopolysiloxanes encompassed by component (i) are specifically exemplified by dimethylvinylsiloxy-endblocked dimethylpolysiloxanes, dimethylvinylsiloxy-endblocked dimethylsiloxane-methylvinylsiloxane copolymers, dimethylvinylsiloxy-endblocked dimethylsiloxane-methylphenylsiloxane copolymers, trimethylsiloxy-endblocked methylvinylpolysiloxanes, trimethylsiloxy-endblocked dimethylsiloxane-methylvinylsiloxane copolymers, trimethylsiloxy-endblocked dimethylsiloxane-methyl(5-hexenyl)siloxane copolymers, dimethylvinylsiloxy-endblocked dimethylsiloxane-methylvinylsiloxane-methylphenylsiloxane copolymer, dimethylhydroxysiloxy-endblocked methylvinylpolysiloxanes, and dimethylhydroxysiloxy-endblocked dimethylsiloxane-methylvinylsiloxane copolymers.

The organopolysiloxane of component (ii) functions as a crosslinker for the addition reaction-curing silicone release coating composition. This component must have a viscosity at 25° C. of 1 to 1,000 centipoise and must contain at least 2 silicon-bonded hydrogen atoms in each molecule. Component (ii) is preferably a compound having the average unit formula $R^5{}_b SiO_{(4-b)/2}$ wherein $R^5$ denotes a hydrogen atom or monovalent hydrocarbon groups free of aliphatic unsaturation, b has a value of from 1.50 to 3.00, with the proviso that at least 2 of the $R^5$ groups in the organopolysiloxane defined by the formula are hydrogen atoms. The monovalent hydrocarbon groups of $R^5$ are as delineated above for $R^4$ including preferred embodiments thereof.

The molecular structure of component (ii) is not critical, and it may be, for example, straight chain, cyclic, network, and partially branched straight chain, with straight-chain structures being preferred. The molecular chain terminal groups for the straight-chain forms of component (ii) are specifically exemplified by trimethylsiloxy, dimethylphenylsiloxy, dimethylhydrogensiloxy, and dimethylhydroxysiloxy. Component (ii) must have a viscosity at 25° C. of 1 to 1,000 centipoise, while the preferred range is 5 to 500 centipoise. When component (ii) has a viscosity at 25° C. of below 1 centipoise, it will be too volatile and the component proportions in the resulting silicone release composition will therefore not be stable. When the viscosity of this component exceeds 1,000 centipoise, the corresponding silicone release composition requires lengthy cure times, and the resulting cured release coating will also exhibit a poorer release performance.

The organopolysiloxanes encompassed by component (ii) are specifically exemplified by trimethylsiloxy-endblocked methylhydrogenpolysiloxanes, trimethylsiloxy-endblocked dimethylsiloxane-methylhydrogensiloxane copolymers, dimethylhydrogensiloxy-endblocked dimethylpolysiloxanes, dimethylhydrogensiloxy-endblocked dimethylsiloxane-methylhydrogensiloxane copolymers, cyclic methylhydrogenpolysiloxanes, and cyclic methylhydrogensiloxane-dimethylsiloxane copolymers.

Component (ii) must be added to the addition reaction-curing silicone release coating composition at about 0.5 to 90 weight parts per 100 weight parts component (i), and is preferably added at 1 to 80 weight parts per 100 weight parts component (i). The basis for this range is that the addition of component (ii) at less than 0.5 weight parts per 100 weight parts component (i) will result in an inadequate cure on the part of the corresponding silicone release composition. An addition in excess of 90 weight parts will impair the release performance of the resulting cured release coating.

The metal catalyst and metal catalyst complexes of Component (iii) for the addition reaction-curing silicone release coating composition are catalysts that accelerate the addition reaction between components (i) and (ii) and cause the composition to cure. Preferably component (iii) is platinum or a platinum compound (i.e. a complex of platinum). Component (iii) is specifically exemplified by chloroplatinic acid, alcohol solutions of chloroplatinic acid, chloroplatinic acid/olefin complexes, chloroplatinic acid/vinylsiloxane complexes, chloroplatinic acid/ketone complexes, platinum supported on alumina micropowder, platinum supported on silica micropowder, and platinum black. The quantity of component (iii) for the addition reaction-curing silicone release coating composition is not critical as long as this component is added in a catalytic quantity. The preferred quantity of component (iii) is 1 to 1,000 ppm based on the weight of (i).

In addition to components (i), (ii), and (iii) described hereinabove, the addition reaction-curing silicone release coating composition may contain an addition reaction inhibitor as an optional component for the purpose of equipping the composition with storage stability at room temperature. Examples of inhibitors suitable for use in the compositions of this invention include acetylenic alcohols such as ethynylcyclohexanol and methylbutynol, conjugated ene-ynes, unsaturated carboxylic esters such as diallyl maleate and dimethyl maleate, maleates and fumarates such as diethyl fumarate, diallyl fumarate, and bis-(methoxyisopropyl) maleate, and half esters and amides. Preferred as the addition reaction inhibitor are alkynyl alcohols such as 3-methyl-1-butyn-3-ol, 3,5-dimethyl-1-hexyn-3-ol, 3-methyl-1-pentyn-3-ol, and phenylbutynol; conjugated ene-ynes such as 3-methyl-3-penten-1-yne and 3,5-dimethyl-1-hexyn-3-ene, benzotriazole, and methylvinylsiloxane cyclics. The quantity of addition reaction inhibitor to the addition reaction-curing silicone release coating composition should be selected as appropriate. Preferably it is added to the composition in an amount of from 0.001 to 5 weight parts per 100 weight parts component (i).

Bath life extender compounds in a total amount sufficient to further retard the curing reaction at room temperature are also suitable for use in the release coating compositions of the present invention. Examples of suitable bath life extender compounds include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2-methoxyethanol, 2-methoxypropanol, and 2-methoxyisopropanol; tetrahydrofuran; water and aqueous solutions of mineral acids, alkalis, and salts. Primary and secondary alcohols, preferably having fewer than 10 carbon atoms are the most preferred for the compositions of this invention. Examples thereof include methanol, 1-butanol, 2-butanol, tetradecanol and other alkanols, such as ethanol, and normal-, and iso-propanol, iso-butanol, and the normal-, secondary-, and iso-pentanols, -hexanols, -heptanols, and -octanols; benzyl alcohol, phenol, and other aromatic alcohols such as methylphenyl carbinol, and 2-phenylethyl alcohol; allyl alcohol, and cyclohexanol. It is highly preferred that the bath life extender is benzyl alcohol or water.

The amount of bath life extender to be used in the compositions of this invention is not critical and is merely that amount that will provide a longer bath life for the composition than the bath life of an identical composition that does not contain the extender. The amount of bath life extender that is to be used in the compositions of this invention can be as high as 10 percent or more by weight, based on the weight of Component (i), however superior results with respect to bath life and cure time can be obtained using a lesser amount. Preferably, the amount of bath life extender to be used in the compositions of this invention falls within the range of 0.1 to 5 percent, and most preferably 1 to 3 percent, by weight, based on the weight of Component (i).

Preferred as the condensation reaction-curing silicone release coating compositions are release coating compositions comprising: (a) 100 weight parts of an organopolysiloxane having at least 2 silicon-bonded hydroxyl groups per molecule and having a viscosity of at least 40 centipoise at 25° C., (b) 0.5 to 90 weight parts of an organopolysiloxane having at least 2 silicon-bonded hydrogen atoms per molecule and having a viscosity of 1 to 1,000 centipoise at 25° C., and (c) 0.01 to 20 weight parts of a metal salt of an organic acid.

The organopolysiloxane of component (a) is the main or base compound of the condensation reaction-curing silicone release coating compositions. This compound must have a viscosity at 25° C. of at least 40 centipoise and must have at least 2 silicon-bonded hydroxyl groups per molecule. Component (a) is preferably a compound having the average unit formula $R^6_c SiO_{(4-c)/2}$ wherein $R^6$ denotes a group selected from monovalent hydrocarbon groups or a silicon-bonded hydroxyl group, and c has a value of from 1.95 to 2.05, with the proviso that at least 2 of R6 groups per compound are silicon-bonded hydroxyl groups. The monovalent hydrocarbon groups of $R^6$ are as delineated above for $R^4$ including preferred embodiments thereof. It is preferred that $R^6$ is methyl.

The molecular structure of (a) is not critical, and it may be, for example, straight chain, cyclic, network, and partially branched straight chain, with straight-chain structures being preferred. The molecular chain terminal groups for the straight-chain forms of (a) are specifically exemplified by dimethylhydroxysiloxy and methylphenylhydroxysiloxy. Component (a) must have a viscosity at 25° C. of at least 40 centipoise, while the upper limit on its viscosity ranges up to and include the use of gums. When component (a) has a viscosity below 40 centipoise, excessively large amounts of the corresponding silicone release composition will infiltrate into the substrate. When the compositions of the present invention are used in a solventless form, (a) preferably has a viscosity at 25° C. of 40 to 10,000 centipoise and more preferably of 100 to 5,000 centipoise. When the compositions of this invention are used in a solvent-based formulation, component (a) preferably has a viscosity at 25° C. of 100,000 centipoise up to the viscosities of gums and more preferably of 500,000 centipoise up to the viscosities of gums.

The organopolysiloxane compounds of component (a) are specifically exemplified by dimethylhydroxysiloxy-endblocked dimethylpolysiloxanes, dimethylhydroxysiloxy-endblocked dimethylsiloxane-methylvinylsiloxane copolymers, dimethylhydroxysiloxy-endblocked dimethylsiloxane-methylphenylsiloxane copolymers, dimethylhydroxysiloxy-endblocked methylvinylpolysiloxanes, dimethylhydroxysiloxy-endblocked methylphenylpolysiloxanes, dimethylhydroxysiloxy-endblocked dimethylsiloxane-methyl(5-hexenyl)siloxane copolymers, and dimethylhydroxysiloxy-endblocked methylphenylpolysiloxanes.

The organopolysiloxane compound of (b) functions as a crosslinker for the condensation reaction-curing silicone release coating compositions of this invention. This compound must have a viscosity at 25° C. of 1 to 1,000 centipoise and must have at least 2 silicon-bonded hydrogen atoms in each molecule. Compound (b) is preferably a compound having the average unit formula $R^7_d SiO_{(4-d)/2}$ wherein $R^7$ is selected from the group consisting of a hydrogen atom and monovalent hydrocarbon groups, and d has a value of 1.50 to 3.00, with the proviso that at least 2 of the $R^7$ groups are hydrogen atoms in each compound. The monovalent hydrocarbon groups of $R^7$ are as delineated above for $R^4$ including preferred embodiments thereof. It is preferred that $R^7$ is methyl.

The molecular structure of (b) is not critical, and it may be, for example, straight chain, cyclic, network, and partially branched straight chain, with straight-chain structures being preferred. The molecular chain terminal groups for the straight-chain forms of (b) are specifically exemplified by trimethylsiloxy, dimethylphenylsiloxy, dimethylhydrogensiloxy, and dimethylhydroxysiloxy. Compound (b) must have a viscosity at 25° C. of 1 to 1,000 centipoise, while the preferred range is 5 to 500 centipoise. When compound (b) has a viscosity at 25° C. of below 1 centipoise, it will be too volatile and the compound proportions in the resulting silicone release composition will therefore not be stable. When the viscosity of this compound exceeds 1,000 centipoise, the corresponding silicone release coating composition requires lengthy cure times, and the resulting cured release coating will also exhibit a poorer release performance.

The organopolysiloxane compounds of (b) are specifically exemplified by trimethylsiloxy-endblocked methylhydrogenpolysiloxanes, trimethylsiloxy-endblocked dimethylsiloxane-methylhydrogensiloxane copolymers, dimethylhydrogensiloxy-endblocked dimethylpolysiloxanes, dimethylhydrogensiloxy-endblocked dimethylsiloxane-methylhydrogensiloxane copolymers, cyclic methylhydrogenpolysiloxanes, and cyclic methylhydrogensiloxane-dimethylsiloxane copolymers.

Compound (b) must be added to the condensation reaction-curing silicone release coating compositions at in amount of from 0.5 to 90 weight parts per 100 weight parts component (a), and preferably is present in amount of from 1 to 80 weight parts per 100 weight parts component (a). The basis for this range is that the addition of component (b) at less than 0.5 weight parts per 100 weight parts component (a) will result in an inadequate cure on the part of the corresponding silicone release composition, and an addition in excess of 90 weight parts will impair the release performance of the resulting cured release coating.

The metal salts of organic acids of component (c) in the condensation reaction-curing silicone release coating compositions of this invention are catalysts that accelerate the condensation reaction between components (a) and (b) and cause the composition to cure. Component (c) is specifically exemplified by dibutylin diacetate, dibutylin dioctoate, dibutylin dilaurate, dioctyltin dilaurate, tin octoate, zinc naphthoate, and iron octoate.

Preferably component (c) is present in the condensation reaction-curing silicone release coating compositions of this invention in an amount of from 0.01 to 20 weight parts per 100 weight parts component (a).

The silicone release coating compositions of this invention may optionally contain organic solvents, adhesion promoters, colorants, pigments, and fillers such as silica micropowder. The use of organic solvents is preferred because they improve the storage stability of the compositions of this invention and improve the coatability on the various substrates. The specific organic solvent is not critical as long as it can provide a homogeneous solution of the composition. The organic solvent is specifically exemplified by aromatic hydrocarbons such as benzene, toluene, and xylene, aliphatic hydrocarbons such as pentane, hexane, and heptane, halogenated hydrocarbons such as trichloroethylene, perchloroethylene, trifluoromethylbenzene, 1,3-bis(trifluoromethyl)benzene, and methylpentafluorobenzene, ethyl acetate and methyl ethyl ketone.

Component (B) in the compositions of the present invention is an organosilicon compound having the general formula

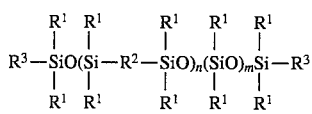

wherein $R^1$ denotes a monovalent hydrocarbon group having from 1 to 10 carbon atoms and free of aliphatic unsaturation, $R^2$ denotes an alkylene group having from 2 to 10 carbon atoms, $R^3$ is selected from the group consisting of a hydrogen atom, an alkenyl group having from 2 to 10 carbon atoms, and a hydroxyl group, m has a value of zero or greater than zero, and n has a value of greater than zero.

This organosilicon compound functions as a CRA and imparts an optimal peel strength to the release coating compositions of this invention when they are applied to a substrate and cured. It also functions to inhibit migration of the base components (i) and (a) into the tacky substance and thereby prevents any reduction in the residual adhesion of the tacky substance.

The group $R^1$ in the preceding formula denotes a monovalent hydrocarbon group having from 1 to 10 carbon atoms and free of aliphatic unsaturation. The group $R^1$ is specifically exemplified by alkyl groups such as methyl, ethyl, propyl, butyl, pentyl, and octyl, aryl groups such as phenyl, tolyl, and xylyl, aralkyl groups such as benzyl and phenethyl, and halogen-substituted alkyl groups such as 3-chloropropyl and 3,3,3-trifluoropropyl. It is preferred that $R^1$ is methyl.

The group $R^2$ in the preceding formula denotes an alkylene group having from 2 to 10 carbon atoms. The group $R^3$ is specifically exemplified by ethylene, propylene, butylene, pentylene, hexylene, and octylene. The group $R^3$ in the preceding formula denotes a hydrogen atom, an alkenyl group having from 2 to 10 carbon atoms, or a silicon-bonded hydroxy group. The alkenyl groups of $R^3$ are specifically exemplified by vinyl, allyl, butenyl, pentenyl, hexenyl, and octenyl. The group $R^3$ of the organosilicon compound is preferably a hydrogen atom or an alkenyl group having from 2 to 10 carbon atoms when (A) is an addition reaction-curing silicone release coating composition. The group $R^3$ of the organosilicon compound is preferably a hydrogen atom or a silicon-bonded hydroxyl group when (A) is a condensation reaction-curing silicone release coating composition of the invention. The subscript m in the preceding formula has a value of zero or greater than zero and n has a value of greater than zero.

The viscosity of organosilicon compound (B) at 25° C. is not critical. The preferred range is 50 to 10,000 centistokes because this range affords excellent handling characteristics for the silicone release composition and excellent release properties on the part of the corresponding cured release coating. The organosilicon compound of the present invention is highly desirable as a CRA for solvent-free silicone release coating compositions because it does not raise the viscosity of the silicone release coating composition. In addition, the peel strength of the final cured release coating can be adjusted by varying the quantity of addition of the organosilicon compound (B) according to the present invention.

Organosilicon compounds suitable as component (B) in the compositions of this invention include compounds having the following general formula:

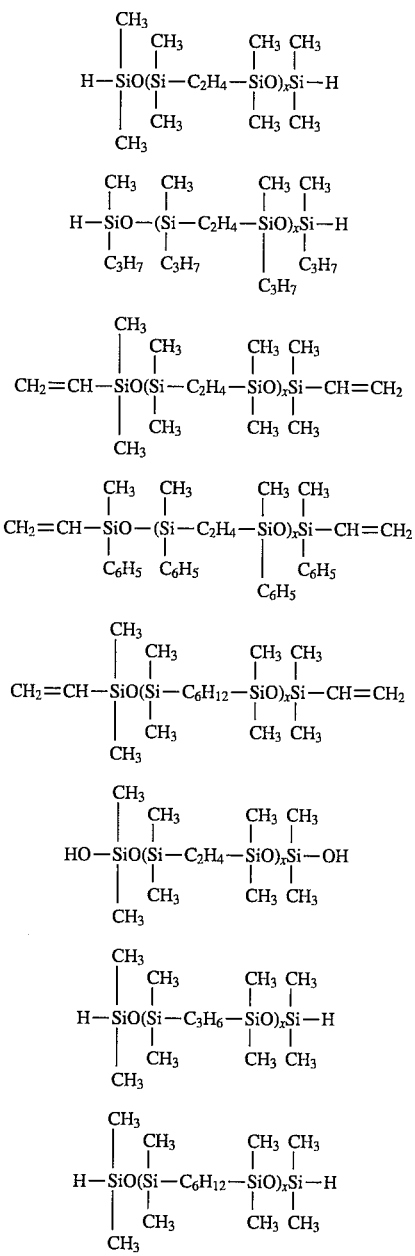

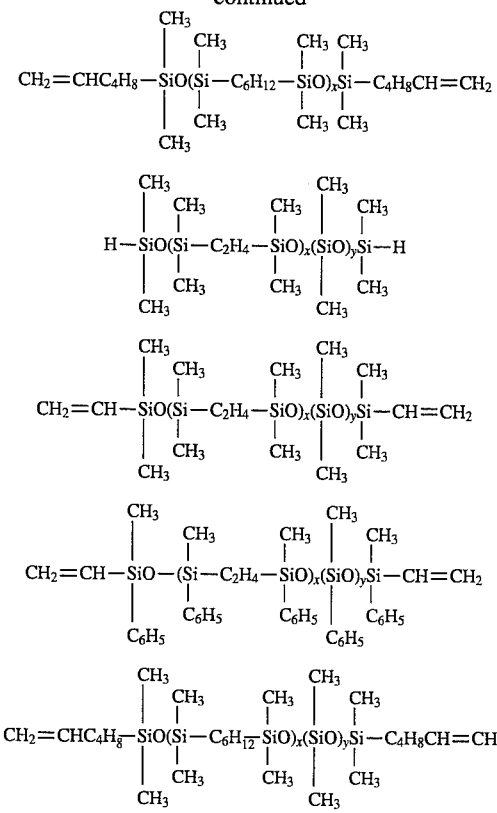

wherein x and y both have a value of greater than zero. No particular restrictions apply to the method for preparing organosilicon compound (B). Organosilicon compound (B) can be prepared, for example, by running an addition polymerization reaction, which is carried out by reacting a diorganosiloxane having the general formula:

wherein $R^1$ denotes a monovalent hydrocarbon group having from 1 to 10 carbon atoms and free of aliphatic unsaturation and m has a value of zero or greater than zero with a diorganosiloxane having the general formula:

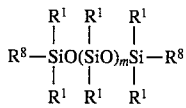

wherein $R^1$ denotes a monovalent hydrocarbon group having from 1 to 10 carbon atoms and free of aliphatic unsaturation, $R^8$ denotes an alkenyl group having from 2 to 10 carbon atoms, and m has a value of zero or greater than zero, in the presence of platinum or a complex of platinum.

Another example of a method for preparing organosilicon compound (B) comprises an addition polymerization reaction, which is carried out by reacting, in the presence of platinum or a platinum complex, a reaction between a diorganosiloxane having the general formula:

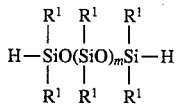

wherein $R^1$ denotes a monovalent hydrocarbon group having from 1 to 10 carbon atoms and free of aliphatic unsaturation and m has a value of zero or greater than zero, and a compound containing unsaturated aliphatic hydrocarbon groups having from 3 to 10 carbon atoms and having 2 carbon-carbon double bonds or a compound containing unsaturated aliphatic hydrocarbon groups having from 2 to 10 carbon atoms and having a carbon-carbon triple bond. Another method for preparing the organosilicon compound (B) of the present invention comprises first hydrolyzing an organosilicon compound having the general formula:

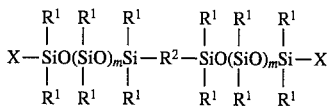

wherein $R^1$ denotes a monovalent hydrocarbon group having from 1 to 10 carbon atoms and free of aliphatic unsaturation, $R^2$ denotes an alkylene group having from 2 to 10 carbon atoms, X denotes a hydrolyzable group, and m has a value of zero or greater than zero, followed by polymerization under acid or base catalysis. In the preceding formula, X denotes a hydrolyzable group and is specifically exemplified by halogen atoms such as chlorine, and bromine, and by alkoxy groups such as methoxy, ethoxy, and propoxy.

The organosilicon compound (B) is present in the compositions of this invention in an amount of from 0.5 to 500 weight parts per 100 weight parts of the organopolysiloxane component (i.e. components (i) or (a)) in the silicone release coating compositions. The basis for this range is that the release resistance of the resulting cured release coating will be too low when organosilicon compound (B) is present at less than 0.5 weight parts per 100 weight parts of the organopolysiloxane component in the silicone release coating composition, while the release resistance of the resulting cured release coating becomes very high when organosilicon compound (B) is present at more than 500 weight parts. In the case of the addition reaction-curing silicone release coating composition discussed above, the organosilicon compound (B) is preferably present in an amount of from 1.0 to 500 weight parts and more preferably at 2.0 to 200 weight parts per 100 weight parts of organopolysiloxane (i). In the case of the condensation reaction-curing silicone release coating composition discussed above, organosilicon compound (B) is preferably present in an amount of from 1.0 to 500 weight parts and more preferably at 2.0 to 200 weight parts per 100 weight parts of organopolysiloxane (a).

The silicone release composition of the invention may be prepared by blending organosilicon compound (B) into the silicone release coating composition either during or after preparation of the silicone release coating composition. The conditions for curing the silicone release compositions of the invention are not critical. For example, the release coating is preferably cured on the coated substrate by applying heat to the substrate at temperatures in the range of from 50° C. to 200° C. The silicone release coating compositions of this invention when cured exhibits optimal release values against tacky substances and can be formed on the surface of substrates such as paper, cardboard, laminated paper, synthetic plastic films, fabrics, synthetic fibers, and metal foils. Substrates having applied thereon such cured release coatings can be used for applications such as process paper, asphalt paper, tapes, and labels. Since the relatively low-viscosity organosilicon compound (B) as described above can be used as the CRA in the silicone release composition of the invention, the compositions of this invention can be used to formulate solvent-free silicone release coatings.

The silicone release coating compositions of the present invention are described below in greater detail through working examples. The viscosity values reported in the examples were measured at 25° C. The cured release coatings were evaluated for their peel strength and residual adhesion of tacky substance in accordance with the following methods.

The peel strength of the cured release coating was evaluated as follows. The silicone release compositions was coated at approximately 1.0 g/m² on polyethylene-laminated kraft paper, and a cured release coating was then produced by heating the coated paper in a forced circulation oven for 30 seconds at 160° C. An acrylic-based pressure-sensitive adhesive (Oribine BPS8170, from Toyo Ink Mfg. Company, Limited) was coated on the resulting cured release coating followed by heating for 2 minutes at 70° C. in a forced circulation oven. A 25-micrometer polyethylene terephthalate film was subsequently applied to the acrylic-based pressure-sensitive adhesive, and the assembly was then held at 25° C. in 60% humidity under a load of 20 gf/cm². A 5-cm wide strip was subsequently cut from the backing paper, and the peel strength (gf) was measured by peeling the backing paper strip at 180° using a Tensilon tester.

The residual adhesion of tacky substances was measured as follows. The silicone release coating composition was coated at approximately 1.0 g/m² on polyethylene-laminated kraft paper, and a cured release coating was then produced by heating the coated paper in a forced circulation oven for 30 seconds at 160° C. Polyester tap (Polyester Tape 31B from Nitto Denko Kabushiki Kaisha) was applied to the cured release coating, and the assembly was heated for 20 hours at 60° C. under a load of 20 gf/cm². The polyester tap was thereafter peeled off and applied to a stainless steel sheet. The peel strength F (gf) was measured by peeling the polyester tape at 180° using a Tensilon tester. In the blank experiment, the same type of polyester tape as above was applied to a sheet of Teflon instead of the silicone release composition. This was followed by heating for 20 hours at 60° C. under a load of 20 gf/cm². The polyester tape was thereafter peeled off and applied to a stainless steel sheet. The peel strength was measured by peeling the polyester tape at 180° using a Tensilon tester to give the reference peel strength $F_0$ for the polyester tape. The peel strength F is reported as a percentage (%) of the reference peel strength $F_0$.

EXAMPLE 1

The following were mixed to homogeneity: 100 weight parts of trimethylsiloxy-endblocked dimethylsiloxane-methylvinylsiloxane copolymer gum (having a vinyl group content of about 1 weight percent), 5 weight parts of trimethylsiloxy-endblocked methylhydrogenpolysiloxane (having a viscosity of about 10 centipoise), 40 weight parts of an organosilicon compound (having a viscosity of about 400 centipoise) having the formula:

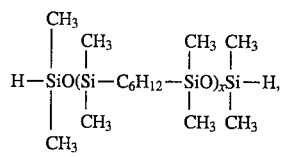

0.9 weight parts 3,5-dimethyl-3-hexen-1-yne, and 1,350 weight parts toluene. A silicone release composition was then prepared by the addition with mixing to homogeneity of sufficient isopropanolic chloroplatinic acid solution to give 100 ppm platinum metal in the chloroplatinic acid based on thee dimethylsiloxane-methylvinylsiloxane copolymer. The peel strength and residual adhesion of the tacky substance were measured on the cured release coating afforded by the cure of this silicone release composition, and these results are reported in Table I.

COMPARATIVE EXAMPLE 1

A silicone release composition was prepared as in Example 1, but in this case without using the organosilicon compound that was used in Example 1. The peel strength and residual adhesion of the tacky substance were measured on the cured release coating afforded by the cure of this silicone release composition, and these results are reported in Table I.

EXAMPLE 2

The following were mixed to homogeneity: 100 weight parts of dimethylvinylsiloxy-endblocked dimethylsiloxane-methylvinylsiloxane copolymer (having a viscosity of about 520 centipoise and a vinyl group content of about 0.8 weight percent), 7 weight parts trimethylsiloxy-endblocked methylhydrogenpolysiloxane (having a viscosity of about 20 centipoise), 64 weight parts of an organosilicon compound (having a viscosity of about 350 centipoise) having the formula

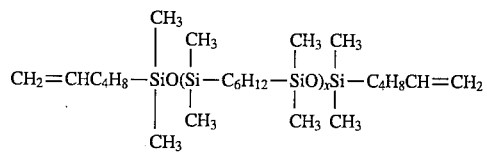

and 0.9 weight parts methylbutynol. A silicone release composition having a viscosity of about 400 centipoise was then prepared by the addition with mixing to homogeneity of sufficient isopropanolic chloroplatinic acid solution to give 190 ppm platinum metal in the chloroplatinic acid based on the dimethylsiloxane-methylvinylsiloxane copolymer. The peel strength and residual adhesion of the tacky substance were measured on the cured release coating afforded by the cure of this silicone release composition, and these results are reported in Table I.

COMPARATIVE EXAMPLE 2

A silicone release composition having a viscosity of 2,000 centipoise was prepared using the procedure of Example 2, but in this case replacing the organosilicon polymer used in Example 2 with a granular silicone copolymer compound having the following average unit formula:

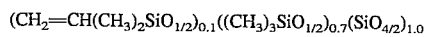

The peel strength and residual adhesion of tacky substance were measured on the cured release coating afforded by the cure of this silicone release composition, and these results are reported in Table I.

EXAMPLE 3

A silicone release composition having a viscosity of 420 centipoise was prepared using the procedure of Example 2, but in this case replacing the organosilicon compound used in Example 2 with 64 weight parts of an organosilicon compound (having a viscosity of about 400 centipoise) having the following formula

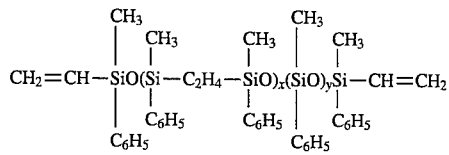

where the ratio of x to y (x:y) is about 9:1. The peel strength and residual adhesion of the tacky substance were measured on the cured release coating afforded by the cure of this silicone release composition, and these results are reported in Table I.

TABLE I

|  | invention examples | | | comparative examples | |
| --- | --- | --- | --- | --- | --- |
|  | Example 1 | Example 2 | Example 3 | Comp. Ex. 1 | Comp. Ex. 2 |
| peel strength (gf/5 cm) | 56 | 63 | 60 | 22 | 54 |
| residual adhesion (%) | 98 | 99 | 98 | 98 | 75 |

EXAMPLE 4

A silicone release composition was prepared by mixing the following to homogeneity in 1,350 weight parts toluene: 100 weight parts of a dimethylhydroxysiloxy-endblocked dimethylpolysiloxane gum, 7 weight parts of trimethylsiloxy-endblocked methylhydrogenpolysiloxane having a viscosity of 10 centipoise, 40 weight parts of an organosilicon compound (having a viscosity of about 400 centipoise) having the following formula:

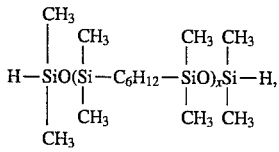

and 5 weight parts of dibutylin diacetate. The peel strength and residual adhesion of tacky substance were measured on the cured release coating afforded by the cure of this silicone release composition, and these results are reported in Table II.

COMPARATIVE EXAMPLE 3

A silicone release composition was prepared using the procedure of Example 4, but in this case without using the organosilicon compound that was used in Example 4. The peel strength and residual adhesion of tacky substance were measured on the cured release coating afforded by the cure of this silicone release composition, and these results are reported in Table II.

EXAMPLE 5

A silicone release composition having a viscosity of 900 centipoise was prepared by mixing the following to homogeneity in 1,390 weight parts toluene: 100 weight parts of dimethylhydroxysiloxy-endblocked dimethylpolysiloxane gum, 12 weight parts of trimethylsiloxy-endblocked methylhydrogenpolysiloxane having a viscosity of 10 centipoise, 40 weight parts of an organosilicon compound (having a viscosity of about 350 centipoise) with the following formula

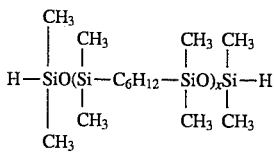

and 5 weight parts dibutylin diacetate. The peel strength and residual adhesion of tacky substance were measured on the cured release coating afforded by the cure of this silicone release composition, and these results are reported in Table II.

COMPARATIVE EXAMPLE 4

A silicone release composition having a viscosity of 7,000 centipoise was prepared using the procedure of Example 5, but in this case replacing the organosilicon compound used in Example 5 with a granular silicone copolymer compound having the following average unit formula:

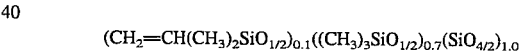

$(CH_2=CH(CH_3)_2SiO_{1/2})_{0.1}((CH_3)_3SiO_{1/2})_{0.7}(SiO_{4/2})_{1.0}$

The peel strength and residual adhesion of the tacky substance were measured on the cured release coating afforded by the cure of this silicone release composition, and these results are reported in Table II.

EXAMPLE 6

A silicone release composition was prepared using the procedure of Example 5, but in this case replacing the organosilicon compound usd in Example 5 with 64 weight parts of an organosilicon compound (having a viscosity of about 1,600 centipoise) having the following formula

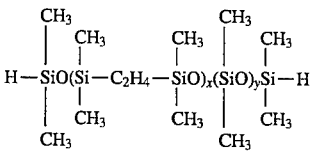

wherein the ratio of x to y (x:y) is about 9:1. The peel strength and residual adhesion of the tacky substance were measured on the cured release coating afforded by the cure of this silicone release composition, and these results are reported in Table II.

TABLE II

|  | invention examples | | | comparative examples | |
| --- | --- | --- | --- | --- | --- |
|  | Example 4 | Example 5 | Example 6 | Comp. Ex. 3 | Comp. Ex. 4 |
| peel strength (gf/5 cm) | 59 | 56 | 53 | 20 | 42 |
| residual adhesion (%) | 94 | 94 | 93 | 94 | 73 |

That which is claimed is:

1. A composition comprising:

(A) a silicone release coating composition; and (B) an organosilicon compound having the general formula:

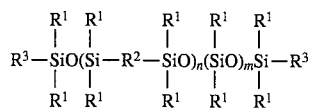

wherein $R^1$ is selected from a monovalent hydrocarbon group having from 1 to 10 carbon atoms and free of aliphatic unsaturation or halogen-substituted alkyl groups, $R^2$ denotes an alkylene group having from 2 to 10 carbon atoms, $R^3$ is selected from the group consisting of a hydrogen atom, an alkenyl group having from 2 to 10 carbon atoms, and a hydroxyl group, m has a value of zero or greater than zero, and n has a value of greater than zero.

2. A composition according to claim 1, wherein (A) is selected from the group consisting of an addition reaction-curing silicone release coating composition, a condensation reaction-curing silicone release coating composition, an organoperoxide-curing silicone release coating composition, and a radiation curing silicone release coating composition.

3. A composition according to claim 2, wherein (A) is an addition-reaction curing silicone release coating composition comprising:

(i) 100 weight parts of an organopolysiloxane having at least 2 alkenyl groups per molecule and having a viscosity of at least 40 centipoise at 25° C.;

(ii) 0.5 to 90 weight parts organopolysiloxane having at least 2 silicon-bonded hydrogen atoms per molecule and having a viscosity of from 1 to 1,000 centipoise at 25° C.; and (iii) a catalytic quantity of a metal catalyst or complex thereof.

4. A composition according to claim 2, wherein (A) is a condensation-reaction curing silicone release coating composition comprising:

(a) 100 weight parts of an organopolysiloxane having at least 2 silicon-bonded hydroxyl groups per molecule and having a viscosity of at least 40 centipoise at 25° C.;

(b) 0.5 to 90 weight parts of an organopolysiloxane having at least 2 silicon-bonded hydrogen atoms per molecule and having a viscosity of from 1 to 1,000 centipoise at 25° C.; and (c) 0.01 to 20 weight parts of a metal salt of an organic acid.

5. A composition according to claim 3, wherein (i) is selected from the group consisting of dimethylvinylsiloxy-endblocked dimethylpolysiloxanes, dimethylvinylsiloxy-endblocked dimethylsiloxane-methylvinylsiloxane copolymers, dimethylvinylsiloxy-endblocked dimethylsiloxane-methylphenylsiloxane copolymers, trimethylsiloxy-endblocked methylvinylpolysiloxanes, trimethylsiloxy-endblocked dimethylsiloxane-methylvinylsiloxane copolymers, trimethylsiloxy-endblocked dimethylsiloxane-methyl(5-hexenyl)siloxane copolymers, dimethylvinylsiloxy-endblocked dimethylsiloxane-methylvinylsiloxane-methylphenylsiloxane copolymers, dimethylhydroxysiloxy-endblocked methylvinylpolysiloxanes, and dimethylhydroxysiloxy-endblocked dimethylsiloxane-methylvinylsiloxane copolymers.

6. A composition according to claim 3, wherein (ii) is selected from the group consisting of trimethylsiloxy-endblocked methylhydrogenpolysiloxanes, trimethylsiloxy-endblocked dimethylsiloxane-methylhydrogensiloxane copolymers, dimethylhydrogensiloxy-endblocked dimethylpolysiloxanes, dimethylhydrogensiloxy-endblocked dimethylsiloxane-methylhydrogensiloxane copolymers, cyclic methylhydrogenpolysiloxanes, and cyclic methylhydrogensiloxane-dimethylsiloxane copolymers.

7. A composition according to claim 3, wherein (iii) is selected from the group consisting of chloroplatinic acid, alcohol solutions of chloroplatinic acid, chloroplatinic acid-olefin complexes, chloroplatinic acid/vinylsiloxane complexes, chloroplatinic acid/ketone complexes, platinum supported on alumina micropowder, platinum supported on silica micropowder, and platinum black.

8. A composition according to claim 3, wherein the composition further comprises an inhibitor.

9. A composition according to claim 8, wherein the inhibitor is selected from the group consisting of acetylenic alcohols, conjugated ene-ynes, maleates, and fumarates.

10. A composition according to claim 8, wherein the inhibitor is selected from the group consisting of 3-methyl-1-butyn-3-ol, 3,5-dimethyl-1-hexyn-3-ol, 3-methyl-1-pentyn-3-ol, phenylbutynol, 3-methyl-3-penten-1-yne 3,5-dimethyl-1-hexyn-3-ene, benzotriazole, and methylvinylsiloxane cyclics.

11. A composition according to claim 8, wherein the composition further comprises a bath life extender.

12. A composition according to claim 11, wherein the bath life extender is selected from the group consisting of compounds having one or more primary or secondary alcohol groups, carboxylic acids, compounds which yield carboxylic acids when exposed to water at room temperature, cyclic ethers, and water.

13. A composition according to claim 4, wherein (a) is selected from the group consisting of dimethylhydroxysiloxy-endblocked dimethylpolysiloxanes, dimethylhydroxysiloxy-endblocked dimethylsiloxane-methylvinylsiloxane copolymers, dimethylhydroxysiloxy-endblocked dimethylsiloxane-methylphenylsiloxane copolymers, dimethylhydroxysiloxy-endblocked methylvinylpolysiloxanes, dimethylhydroxysiloxy-endblocked methylphenylpolysiloxanes, dimethylhydroxysiloxy-endblocked dimethylsiloxane-methyl(5-hexenyl)siloxane copolymers, and dimethylhydroxysiloxy-endblocked methylphenylpolysiloxanes.

14. A composition according to claim 4, wherein (b) is selected from the group consisting of trimethylsiloxy-endblocked methylhydrogenpolysiloxanes, trimethylsiloxy-endblocked dimethylsiloxane-methylhydrogensiloxane copolymers, dimethylhydrogensiloxy-endblocked dimethylpolysiloxanes, dimethylhydrogensiloxy-endblocked dimethylsiloxane-methylhydrogensiloxane copolymers, cyclic methylhydrogenpolysiloxanes, and cyclic methylhydrogensiloxane-dimethylsiloxane copolymers.

15. A composition according to claim 4, wherein (c) is selected from the group consisting of dibutylin diacetate, dibutylin dioctoate, dibutylin dilaurate, dioctyltin dilaurate, tin octoate, zinc naphthoate, and iron octoate.

16. A composition according to claim 8, wherein the composition further comprises an organic solvent, selected from the group consisting of benzene, toluene, xylene, pentane, hexane, heptane, trichloroethylene, perchloroethylene, trifluoromethylbenzene, 1,3-bis(trifluoromethyl)benzene, methylpentafluorobenzene, ethyl acetate, and methyl ethyl ketone.

17. A composition according to claim 11, wherein the composition further comprises an organic solvent selected from the group consisting of benzene, toluene, xylene, pentane, hexane, heptane, trichloroethylene, perchloroethylene, trifluoromethylbenzene, 1,3-bis(trifluoromethyl)benzene, methylpentafluorobenzene, ethyl acetate, and methyl ethyl ketone.

18. A composition according to claim 4, wherein the composition further comprises an organic solvent selected from the group consisting of benzene, toluene, xylene, pentane, hexane, heptane, trichloroethylene, perchloroethylene, trifluoromethylbenzene, 1,3-bis(trifluoromethyl)benzene, methylpentafluorobenzene, ethyl acetate, and methyl ethyl ketone.

19. A composition according to claim 1, wherein $R^1$ is selected from the group consisting of methyl, ethyl, propyl, butyl, pentyl, octyl, phenyl, tolyl, xylyl, benzyl, phenethyl, 3-chloropropyl, and 3,3,3-trifluoropropyl.

20. A composition according to claim 1, wherein $R^2$ is selected from the group consisting of ethylene, propylene, butylene, pentylene, hexylene, and octylene.

21. A composition according to claim 1, wherein $R^3$ is selected from the group consisting of vinyl, allyl, butenyl, pentenyl, hexenyl, and octenyl.

22. A composition according to claim 1, wherein (B) is a compound having its formula selected from the group consisting of:

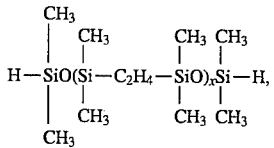

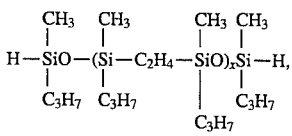

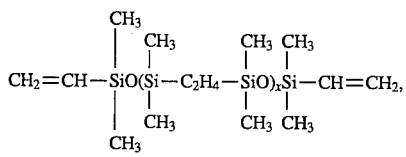

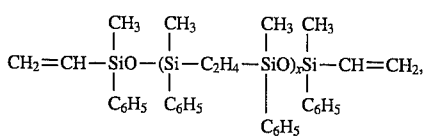

-continued

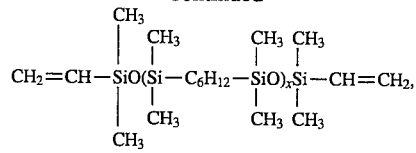

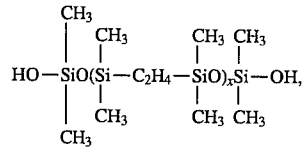

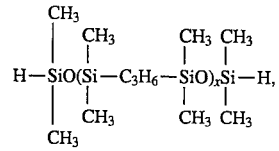

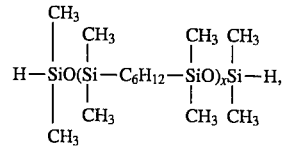

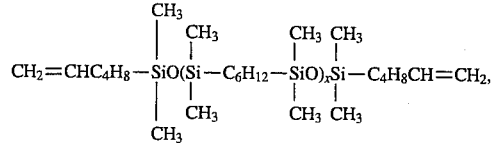

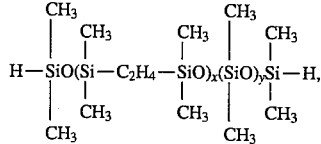

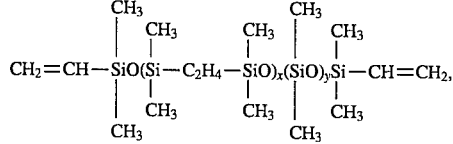

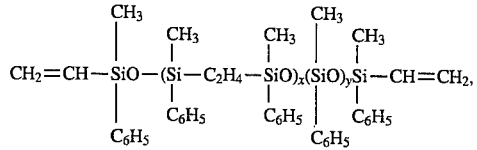

and

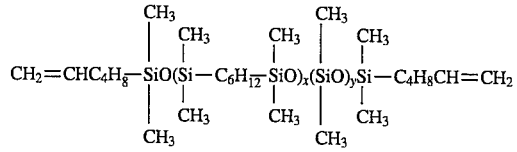

wherein x and y both have a value of greater than zero.

* * * * *